United States Patent
Sandler et al.

(10) Patent No.: US 6,421,542 B1
(45) Date of Patent: Jul. 16, 2002

(54) FREQUENCY REUSE IN MILLIMETER-WAVE POINT-TO-MULTIPOINT RADIO SYSTEMS

(75) Inventors: Howard M. Sandler, Ottawa; Stuart Dean, Kemptville; Paul Astell, Nepean, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/382,500

(22) Filed: Aug. 25, 1999

Related U.S. Application Data

(63) Continuation-in-part of application No. 09/307,692, filed on May 10, 1999.
(60) Provisional application No. 60/085,351, filed on May 13, 1998.

(51) Int. Cl.[7] .............................. H04Q 7/20; H04Q 7/30
(52) U.S. Cl. .................. 455/561; 455/562; 455/450; 455/452; 455/424
(58) Field of Search ................. 455/447, 561, 455/562, 450, 452, 453, 422, 424, 425, 509, 25, 500, 517, 550, 426, 403

(56) References Cited

U.S. PATENT DOCUMENTS

| | | | |
|---|---|---|---|
| 4,128,740 A | * | 12/1978 | Graziano .................. 455/562 |
| 5,276,907 A | * | 1/1994 | Meidan ..................... 455/452 |
| 5,649,292 A | | 7/1997 | Doner ....................... 455/450 |
| 5,668,610 A | | 9/1997 | Bossard et al. ............ 455/450 |
| 5,809,431 A | | 9/1998 | Bustamante et al. ...... 455/450 |
| 5,857,142 A | | 1/1999 | Lin et al. .................. 455/450 |

* cited by examiner

Primary Examiner—William Trost
Assistant Examiner—Keith Ferguson
(74) Attorney, Agent, or Firm—Gibbons, Del Deo, Dolan, Griffinger & Vecchione

(57) ABSTRACT

A millimeter-wave point-to-multipoint LMDS radio system for broadband wireless access having frequency reuse that includes a cell area divided into an integer number k sub-sectors of equal angular arc 360/k degrees each; a hub having antennas each configured to generate an antenna beam that covers an integer number j sub-sectors, an angular gap i being defined between edges of coverage of one of the antennas where i is an integer number of sub-sectors; a total integer number of n channel sets each of at least one radio channel and each configured independent and free of interference from other ones of the channels in other ones of the channel sets, each of the channel sets having a number of uses defined by a quantity k/(i+j) that is an integer equal or greater than two, each channel set being deployed with a common re-use pattern with an angular stagger between antennas of (i+j)/n sub-sectors.

28 Claims, 8 Drawing Sheets

FREQUENCY REUSE IN MILLIMETER-WAVE POINT-TO-MULTIPOINT RADIO SYSTEMS

CROSS-REFERENCE TO RELATED PATENT APPLICATIONS

This is a continuation-in-part of U.S. Ser. No. 09/307,692, filed May 10, 1999, which is a utility patent application based on provisional patent application No. 60/085,351, filed May 13, 1998.

STATEMENT REGARDING FEDERALLY SPONSORED RESEARCH OR DEVELOPMENT

Not Applicable.

BACKGROUND OF THE INVENTION

1. Field of the Invention

The invention relates to antenna configurations in a sectorized radio system coverage area served by a central hub station that employs frequency re-use of a given channel in different sectors.

2. Discussion of Related Art

Fixed point-to-multipoint radio systems operate at millimeter-wave frequencies or microwave frequencies. Such systems that operate at 24–42 GHz are sometimes termed Local Multipoint Distribution Systems (LMDS) or Local Multipoint Communications Systems (LMCS). These systems could be either one-way broadcast type, or two-way systems. Such systems that operate at approximately 2.5 GHz are sometimes termed Multi-channel Multipoint Distribution Systems (MMDS). Traditional cellular radio systems that use antennas provide sectorization of a cell.

In all cellular-structured radio systems, there is frequency re-use. In VHF and UHF bands, this means the re-use of a given channel in a nearby cell. At higher frequencies, such as millimeter-wave bands from 24–42 GHz, and possibly at lower microwave frequencies such as 2.5 GHz, radio propagation is closer to straight-line and base station or "hub" antenna patterns are sharply defined. This opens the possibility of re-using a given channel within the same cell site in another sector.

An area to be served by a single hub is angularly-divided into k sub-sectors of equal angular arc, the sub-sectors radiating out from the hub. All antennas have identical sectoral radiation patterns approximately j sub-sectors wide. A first such antenna provides coverage of the first j sub-sectors using a first channel set. After a gap of the next i sub-sectors, the next j sub-sectors are covered by another antenna re-using the first channel set. This continues around 360 degrees of arc. The quantities k, i, j and k/(i+j) are integers. k/(i+j)>=2 and is equal to the number of times the first channel set is reused in the cell.

A second channel set is used to provide additional beams. These are similarly spaced i+j sub-sectors apart, but the first such beam is angularly staggered from the beams using the first channel set by (i+j)/n sub-sectors, where n is the total number of channel sets available. The quantity (i+j)/n need not necessarily be an integer. There are also k/(i+j) re-uses of the second channel set. The other channel sets, up to a total of n channel sets, are similarly staggered. In total, there are kn/(i+j) antenna beams using n channel sets. For complete coverage of 360 degrees with no gaps, n>1+i/j is required.

The traffic capacity of a cellular radio system is proportional to the number of channel sets in use. A normalized measure of capacity is therefore the number of beams per hub divided by the number of channel sets available to the system. By this measure, a conventional cellular radio system with an omnidirectional antenna radiating n channel sets would have a capacity of 1.

The capacity of conventional cellular radio systems may be increased with narrow-beam sector antennas at the hub. However, adding antennas to an existing hub requires replacement or re-orientation of the existing antennas. Also, existing hubs have no appreciable redundancy so that equipment failure results in loss of service until repairs are complete. Still, redundancy may be made available but it requires doubling the number of radios.

BRIEF SUMMARY OF THE INVENTION

One aspect of the present invention relates to an improved system of frequency reuse in millimeter-wave point-to-multipoint LMDS radio systems for broadband wireless access in which each channel can be reused several times within a single base station or hub in order to increase traffic capacity.

The cell area is divided into an integer number k sub-sectors of equal angular arc 360/k degrees each. Each antenna beam covers an integer number of j sub-sectors. Each channel set, out of a total integer of n sets, is re-used. The angular gap between edges of beams, which use the same channel set, is an integer number of i sub-sectors. The quantity k/(i+j), which is equal to the number of uses of each channel set, must be an integer greater or equal than 2. Each channel set is deployed with the same re-use pattern, but the channel sets are angularly staggered from each other by (i+j)/n sub-sectors, which is not necessarily an integer. To cover each part of the cell with a uniform number of channel sets using the minimum number of channel sets, then n=i+j, the angular stagger between antennas is one sub-sector, and there are k antennas. The number of channels within each channel set need not be equal. In total, the hub uses kn/(i+j) antenna beams, and the normalized traffic capacity is k/(i+j).

The invention may serve unanticipated locally higher capacity requirements in some portions of the cell by permitting an increase in capacity to be effected without the need to employ narrow-beam sector antennas at the hub. Additional antennas can be added to an existing hub without the need to replace or re-orient the existing antennas. Overlapping sector beams provide redundancy to increase reliability in the event of equipment failure.

BRIEF DESCRIPTION OF THE SEVERAL VIEWS OF THE DRAWING

For a better understanding of the present invention, reference is made to the following description and accompanying drawings, while the scope of the invention is set forth in the appended claims.

DETAILED DESCRIPTION OF THE INVENTION

Figure 1:
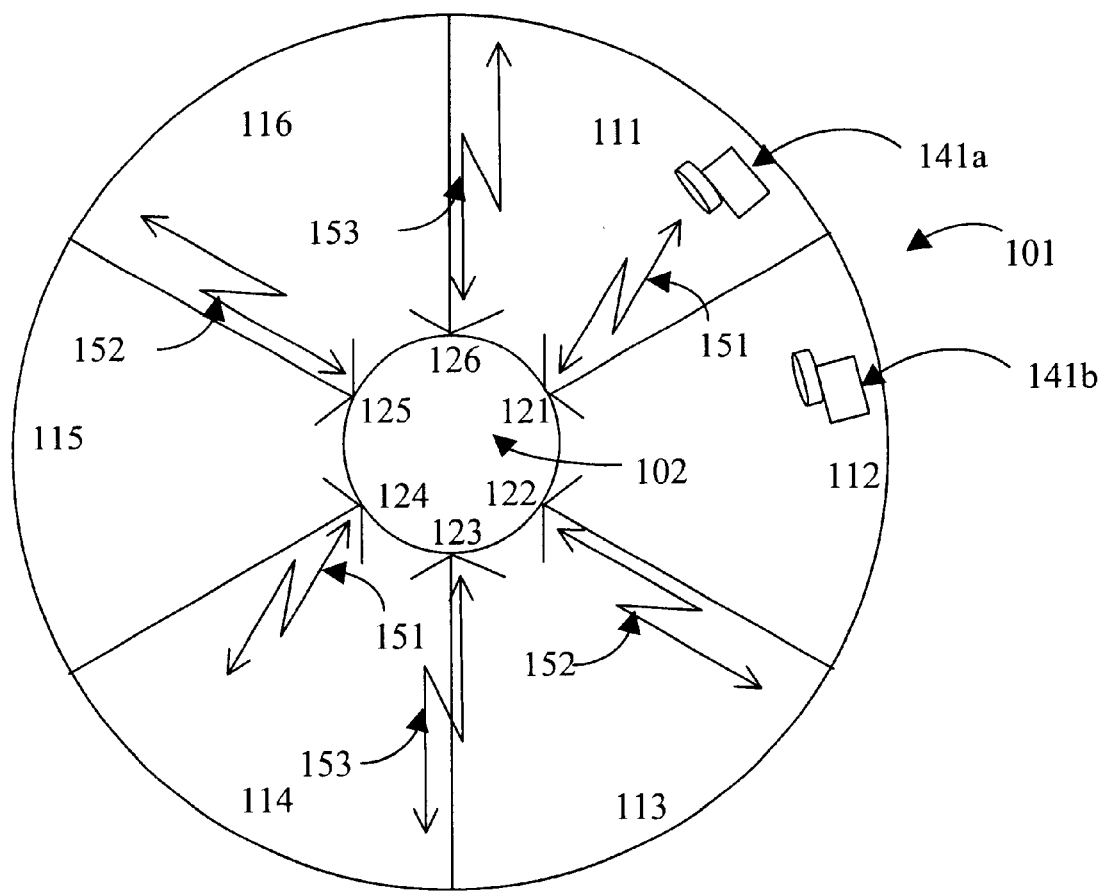
FIG. 1 is a schematic representation of a circular coverage area of a cellular radio system in accordance with an embodiment of the invention that has sector antenna beams, each being 120 degrees wide and having an angular stagger between antennas that is an integer number of 60 degree sub-sectors.

FIG. 1 depicts a circular coverage area or cell 101, with a base station or hub 102 at its center, divided into k (k=6) equal 60 degree sub-sectors 111–116. The hub 102 comprises backhaul facilities, such as optical fiber or leased lines, multiplexing equipment, radio modems, radios and antennas. The hub is capable of radiating and/or receiving one or more modulated radio channels through each antenna.

A first hub antenna 121 having a 120 degree radiation pattern (approximately pie-shaped) provides coverage to remote stations such as 141a and 141b, located in j (j=2) sub-sectors 111 and 112. Communications through antenna 121 make use of a first channel set 151.

A channel set is a set of one or more radio channels, which are approximately "orthogonal", i.e., independent and free from interference from all other channels in the other channel sets. Commonly, channel sets are comprised of a set of distinct radio carrier frequencies. However, channel sets could also be comprised of sets of independent time slots (in time-division multiple access systems) or substantially uncorrelated spreading codes (in code-division multiple access systems) or unique combinations of frequencies, time slots or spreading codes. Further, the use of a frequency in conjunction with horizontally polarized antennas in one channel set and vertically polarized antennas in another channel set allows the same frequency to be included in two different channel sets.

After a gap i (i=1) sub-sectors, (sub-sector 113), channel set 151 is re-used again, in this case in the beam of antenna 124, which covers sub-sectors 114 and 115. Thus, channel set 151 is reused 2 times in the cell, or k/(i+j) times in general.

A second channel set 152 is used for the beam of antenna 122, which covers sub-sectors 112 and 113. A third channel set 153 is used for the beam of antenna 123, which covers sub-sectors 113 and 114. The angular stagger, in sub-sectors between beams is one sub-sector, or in general, (i+j)/n, where n is the total number of channel sets to be used in the cell.

Similar to channel set 151, channel set 152 is re-used again, with a gap of 1 sub-sector between the edge of its beam and the beginning of the next beam which re-uses the same channel set. The second use of channel set 152 is from antenna 125, which covers sub-sectors 115 and 116.

Similar to channel sets 151 and 152, channel set 153 is used twice, from antenna 123 which covers sub-sectors 113 and 114, and from antenna 126 which covers sub-sectors 116 and 111.

The complete system consists of 6 antennas using 3 channel sets. The system provides complete coverage to all portions of the cell. Two overlapping beams cover every cell portion.

Figure 2:
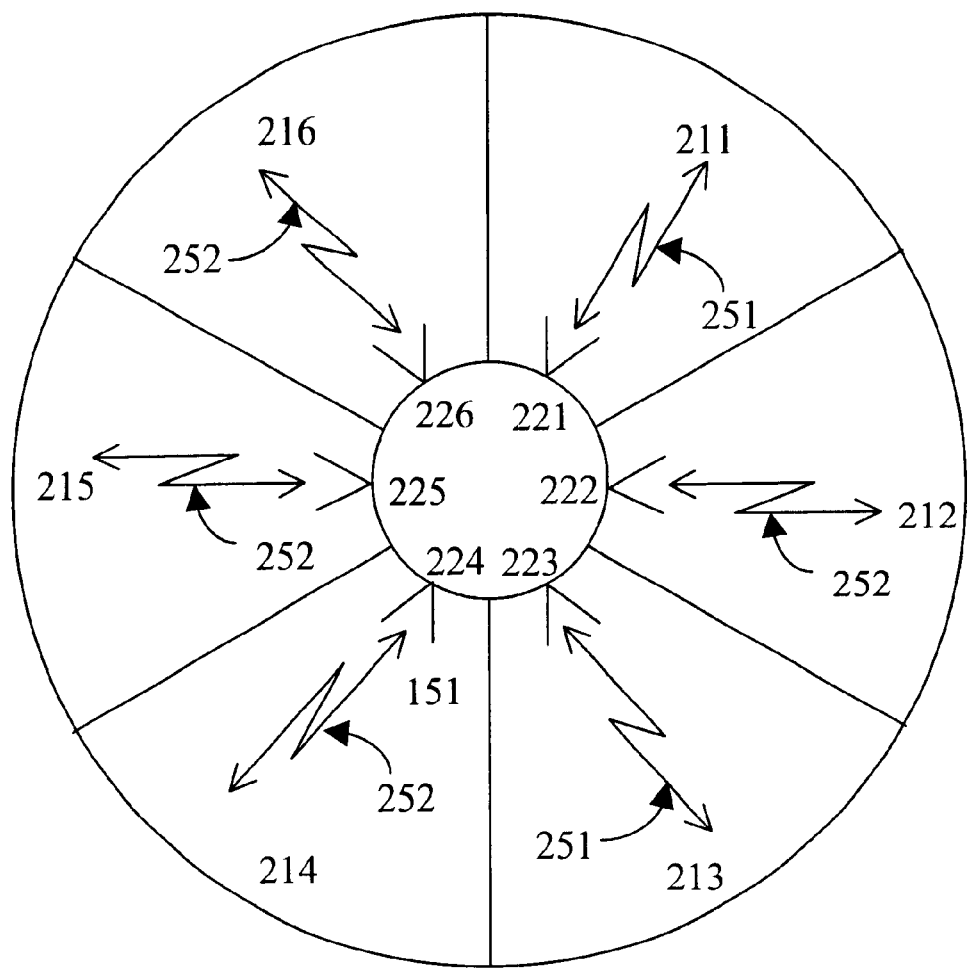
FIG. 2 is a schematic representation of a circular coverage area of a cellular radio system in accordance with a further embodiment of the invention. This embodiment has sector antenna beams, each being 60 degrees wide and an angular stagger between antennas that is an integer number of 60 degree sub-sectors.

Turning to FIG. 2, an embodiment is shown where j=1 and i=1, which means that k must be even. Where n=2, a pattern of non-overlapping sectors with channel sets alternating in adjacent sectors results. FIG. 2 depicts an embodiment where k=6, which means that sector antenna beams are 60 degrees wide. Antennas 221–226 cover sub-sectors 211–216 respectively. Antennas 221, 223 and 225 use the channel set 251. Antennas 222, 224 and 226 use the channel set 252. The normalized capacity of this system is 3, which is greater than the case of FIG. 1.

Figure 3:
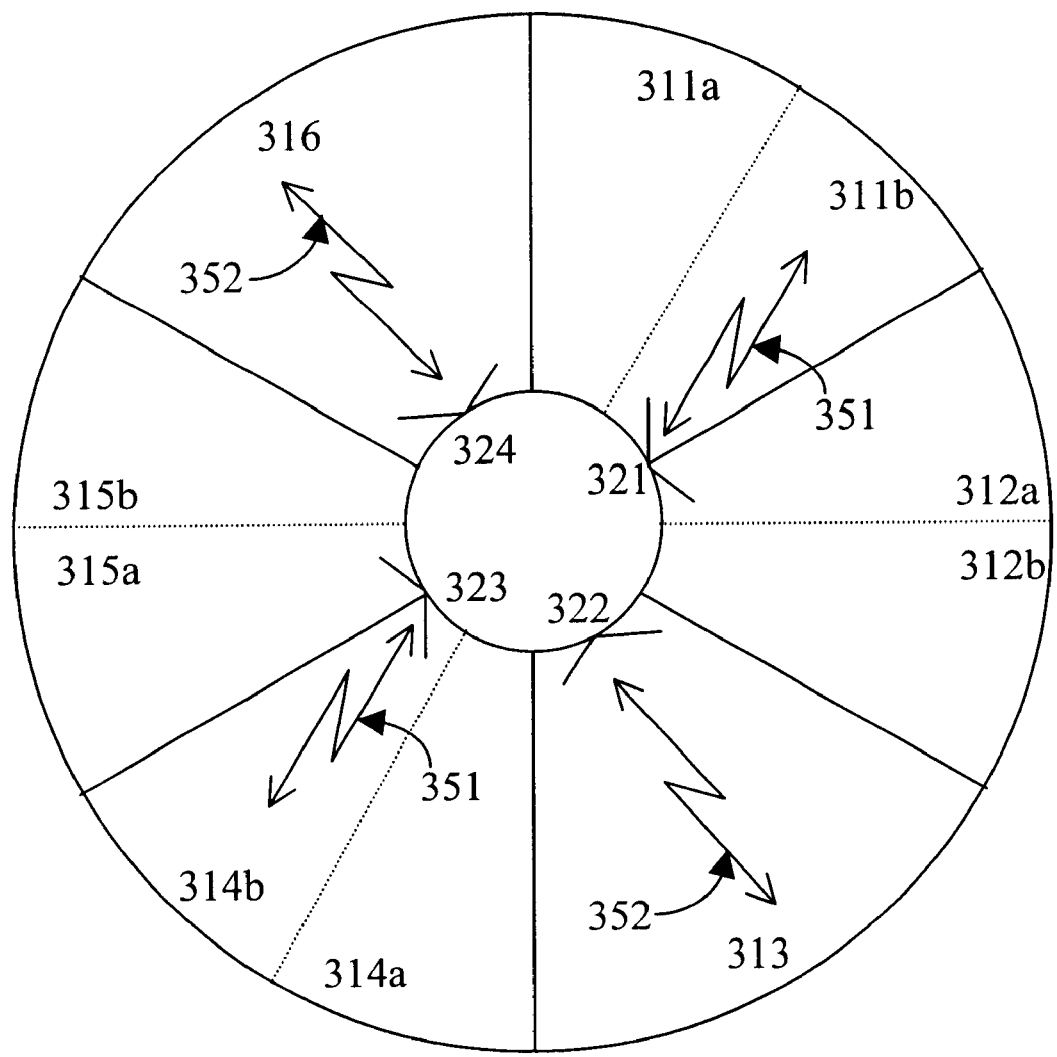
FIG. 3 is a schematic representation of a circular coverage area of a cellular radio system in accordance with another embodiment of the invention. This embodiment has sector antenna beams, each being 120 degrees wide and an angular stagger between antennas that is a non-integer number of 60 degree sub-sectors.

Turning to FIG. 3, an embodiment is shown where k=6 as in FIG. 2, except that not all areas are served by the same number of beams. In the embodiment of FIG. 3, n<(i+j) but n>=1+i/j so that there is complete coverage of the entire cell by at least one beam, but not all areas are served by the same number of beams. Here, j=2 and i=1 as in FIG. 1, but n=2, not 3 as in FIG. 1.

In this particular case, the angular stagger between the two channel sets, (i+j)/n sub-sectors is a non-integer, 1.5 sub-sectors. Antennas 321–324 have 120 degree patterns, as in FIG. 1. Antenna 321 covers sub-sectors 311 and 312 using channel set 351. Antenna 322 covers sub-sector 313, as well as half 312b of sub-sector 312 and half 314a of sub-sector 314 using channel set 352. Antenna 323 covers sub-sectors 314 and 315 using channel set 351. Antenna 324 covers sub-sector 316, as well as half 315b of sub-sector 315 and half 311a of sub-sector 311 using channel set 352.

Note that only ⅓ of the cell area is covered by two channel sets 351 and 352; the other ⅔ is covered by only 1 channel set. The only portions covered by two channel sets are half 311a of sub sector 311, half 312b of sub-sector 312, half 314a of sub-sector 314 and half 315b of sub-sector 315. Average normalized traffic capacity across the entire cell is still 2, as in FIG. 1, however. This configuration is useful if there are not enough orthogonal channels available in the system to form 3 channel sets, or if j>>i and therefore the areas with lower capacity are a small fraction of the cell. Also, the stagger need not be exactly (i+j)/n sub-sectors in this case for the properties to hold.

Many LMDS systems are based on 4-sectored cells, so that the hubs may be laid out on a square grid with square coverage areas. The system of the present invention may be advantageously employed to split such cells without disturbing the original 4 antennas, as shown in the embodiment of FIG. 4.

Figure 4:
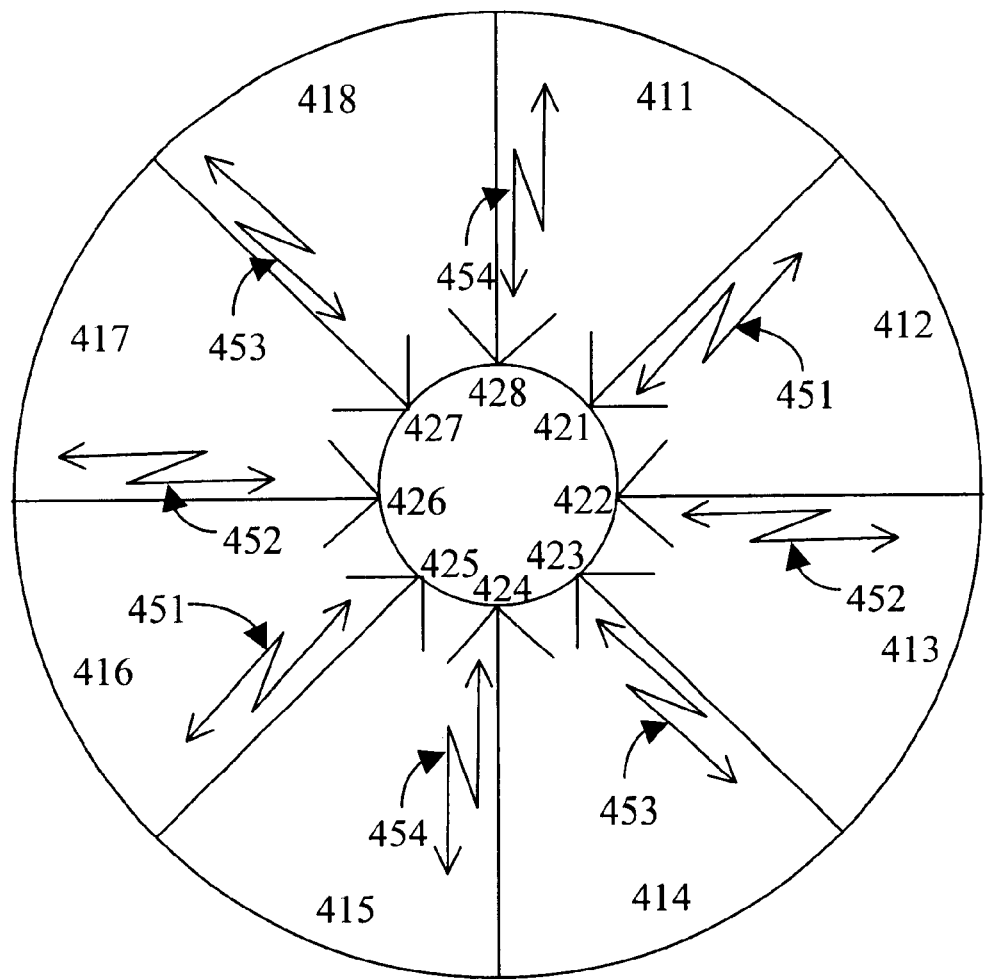
FIG. 4 is a schematic representation of a circular coverage area, which is used for a cellular radio system in accordance with yet a further embodiment of the invention. This embodiment has sector antenna beams, each being 90 degrees wide and having an angular stagger between stagger between antennas that is an integer number of 45 degree sub-sectors.

FIG. 4 depicts an 8-sectored system using 90 degree beams, which may be obtained by addition of four antennas to a pre-existing 4-sectored cell. In this case, k=8, j=2, i=2, n=4. Normalized capacity is 2. Antenna 421 covers sub-sectors 411 and 412 using channel set 451. Antenna 422 covers sub-sectors 412 and 413 using channel set 452. Antenna 423 covers sub-sectors 413 and 414 using channel set 453. Antenna 424 covers sub-sectors 414 and 415 using channel set 454. Antenna 425 covers sub-sectors 415 and 416 using channel set 451. Antenna 426 covers sub-sectors 416 and 417 using channel set 452. Antenna 427 covers sub-sectors 417 and 418 using channel set 453. Antenna 428 covers sub-sectors 418 and 411 using channel set 454.

Referring to FIG. 1, assume that there is a failure of the hub radio that serves antenna 121. Remote station 141b loses communication with the hub. Following its pre-configured strategy, it would then re-tune to a channel within channel set 152, as it is located in sub-sector 112, which is also covered by channel set 152. It could then re-establish communications with the hub via antenna 122. Similarly, remote station 114a would re-tune to a channel within channel set 153, as it is located in sub-sector 111, which is also covered by antenna 126 using channel set 153. Thus, the overlapping sector system can provide equipment redundancy without the need for additional radios, which increases the availability of the system in the face of equipment failure at the hub.

Figure 5:
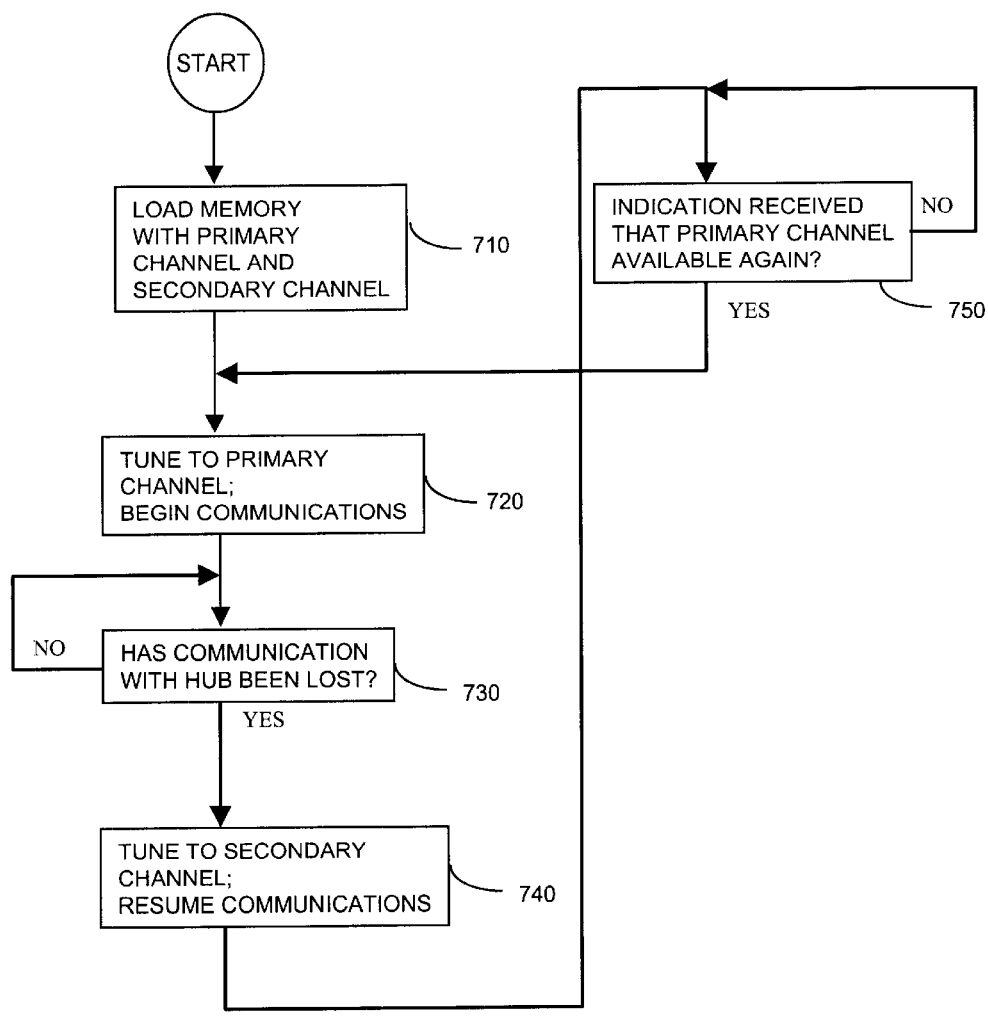
FIG. 5 is a flow chart of an algorithm used by a remote station to recover from equipment failure at the hub.

FIG. 5 depicts a flow chart of the algorithm used by a remote station such as 141b to recover from equipment failure at the hub. At the time of initializing a new subscriber station, step 710 is performed. Remote station 141b (FIG. 1), for example, would be loaded with a primary channel in channel set 151, and a secondary channel in channel set 152. At step 720 (FIG. 5), the remote station tunes to the primary channel and begins monitoring downstream signaling from hub 102 (FIG. 1) via antenna 121. The remote station then enters a loop at step 730 (FIG. 5) in which it continually checks if communication with the hub on the primary channel has been lost.

For example, the remote station might expect a regular message from the hub and reset a timer each time the message is received. Expiry of the timer would indicate that the regular message was not received within a certain time interval and would be an indication of probable hub failure of the radio using antenna 121 (FIG. 1). This condition would cause the remote station, at step 740 (FIG. 5), to re-tune to its secondary channel, which would be in channel set 152. As antenna 122 using channel set 152 covers the area of the cell where remote station 141b is located, the remote station would then be able to successfully re-establish communications with the hub.

The failure of a radio connected to antenna 121 would be expected to cause system alarms resulting in notification of the network operator and eventual replacement of the radio. When channel set 151 from antenna 121 becomes available again, the hub could send a notification message to remote station 141b. This notification would be sent via antenna 122 on the channel within channel set 152 in use by remote station 141b. At step 750, this notification would be detected. The remote station would re-tune to the primary channel again, and re-establish communications with the hub via antenna 121.

Also, the system of the present invention has an increased ability to serve local "hot spots" of traffic within the coverage area of the hub compared to conventional narrow-beam sectorization systems. As each beam covers a relatively broad area, the total traffic of high-traffic and low-traffic sub-areas within the covered sector may remain within the traffic limit that can be serviced by a channel set.

An additional advantage of this system accrues if the remote stations have the ability to dynamically re-tune from channels in one channel set to channels in another channel set. This re-tuning may preferably arise upon loss of communication or upon an indication from the hub of current traffic conditions.

For example, in FIG. 1, assume remote station 141b is in communication with the hub station via antenna 121 using a channel in channel set 151. Remote station 141b could be pre-configured to re-tune to a certain channel within channel set 152 in the event it loses communication on the channel in channel set 151. Furthermore, since each remote station is within the coverage area of two channel sets, the hub could load balance, or dynamically assign remote stations to one channel set or the other, depending on traffic conditions of the moment, in order to make full use of both channel sets. Alternatively, the hub could broadcast information about current traffic loading of each channel set, and the remote stations could autonomously choose which channel sets to use based on the information.

Figure 6:
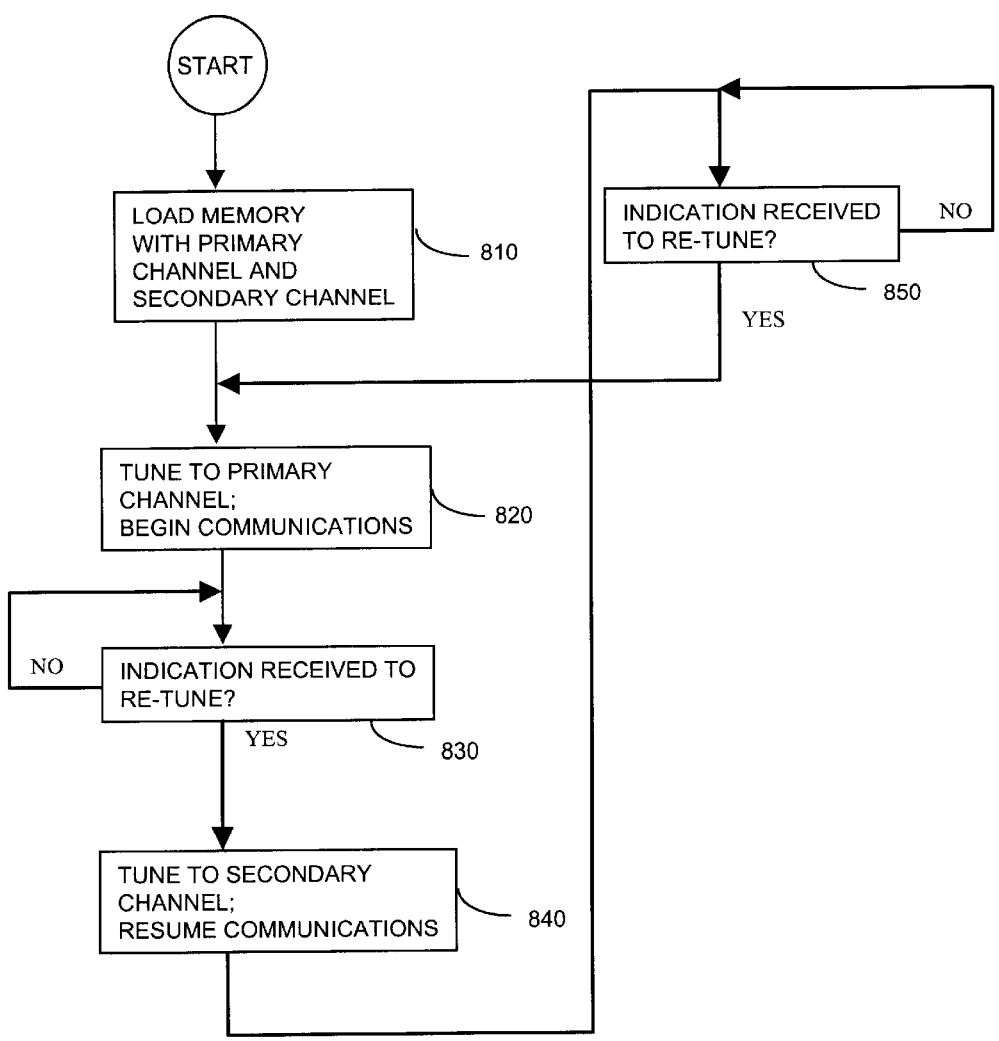
FIG. 6 is a flow chart of an algorithm used by a remote station to dynamically re-tune channels in response to load-balancing at the hub.

FIG. 6 depicts a flow chart of the algorithm used by a remote station, such as 141b (FIG. 1), to dynamically re-tune channels in response to load-balancing at the hub. At the time of initializing a new subscriber station, step 810 is performed. Remote station 141b, for example, would be loaded with a primary channel in channel set 151, and a secondary channel in channel set 152. At step 820, the remote station tunes to the primary channel and begins monitoring downstream signaling from hub 102 via antenna 121. Note that these are the same steps required for the redundancy-switching algorithm described in FIG. 5. The remote station then enters a loop at step 830 in which it continually checks if the hub has indicated the need to re-tune to another channel. This condition would cause the remote station, at step 840, to re-tune to its secondary channel, which would be in channel set 152. As antenna 122 using channel set 152 covers the area of the cell where remote station 141b is located, the remote station would then be able to successfully re-establish communications with the hub. The hub would request this channel change, for example, if channel set 151 is being used to full capacity by another remote station, whereas channel set 152 has spare capacity.

When traffic conditions make it advantageous for the hub to move remote station 141b back to a channel in channel set 151, the hub could send a notification message to the remote station at step 850. The remote station would re-tune to the primary channel again, and re-establish communications with the hub via antenna 121.

Even without dynamic re-tuning, the system of the present invention provides an improved ability to serve local "hot spots" of traffic, which may not be predicted at the time of deployment. Each antenna covers a relatively wide area of two sub-sectors, as compared to a system using 60 degree antennas. However, what counts is the total traffic seen from all remote stations in a 120 degree area. Therefore, high traffic from a few users in one 60 degree sub-sector may be balanced by low traffic from other users in the adjacent 60 degree sub-sector covered by the same antenna. As a result, the total traffic is still below the average traffic per sub-sector that the system is designed to serve.

Figure 8:
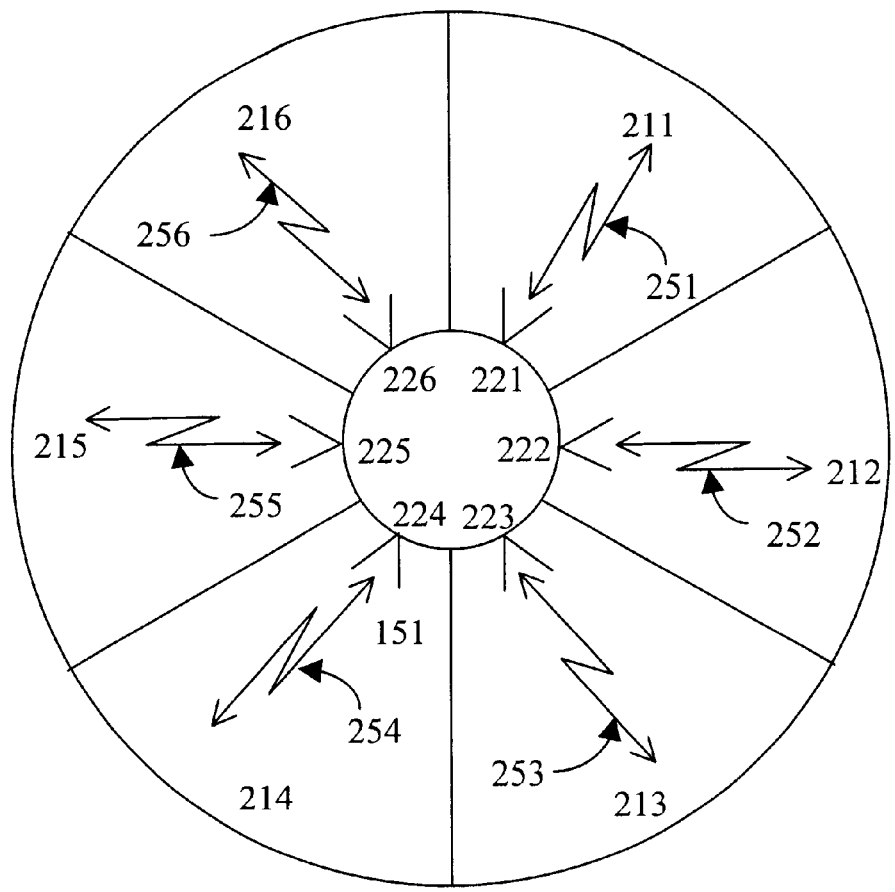
FIG. 8 is a schematic representation of a conventional cell-splitting technique.

For example, assume that the capacity of each channel set is 1 Mbit/s and each remote station presents a demand of 0.1 Mb/s. Thus, each channel set can support 10 remote stations. In the conventional 6-sectored arrangement of FIG. 8, each 60 degree sector can contain 10 remote stations, and the overall cell capacity is 60 remote stations. In the arrangement of FIG. 1, according to the present invention, there is also a total of 6 channel sets in use. This results in a total cell capacity of 60 remote stations; however, the arrangement is more tolerant of localized "hot spots" containing more than 10 remote stations in a given 60 degree sub-sector. For example, suppose sub-sector 111 contains 12 remote stations and sub-sector 112 contains 8 remote stations. In this case, 10 remote stations in sub-sector 111 can be served using channel set 151 from antenna 121. The other 2 remote stations in sub-sector 111 could be served using channel set 152 from antenna 122, along with the 8 remote stations in sub-sector 112.

When j=1, there is no overlap of sectoral beams. When j>=2, the sectoral beams overlap. When j>=2 and in addition, n=i+j, then every portion of the coverage area is served by j beams and capacity is uniform throughout the cell. The system of this invention provides a normalized capacity of k/(i+j), which is always at least 2, therefore providing capacity gain over a conventional system.

Furthermore, by using overlapped sector beams, the system of this invention provides capacity gain without the need to employ sector antennas with coverage angles as narrow as a sub-sector. This may be advantageous, for example, in that a radio network operator can make use of one relatively broad-beamed antenna type to provide maximum coverage with minimum number of sector antennas in some cells, yet the operator can also configure high-capacity cells using the same part.

In addition, an operator can use the system of this invention to provide additional traffic capacity in an existing hub by the addition of new overlapping beams to the existing beams. This has an advantage over conventional cell splitting in that the existing antennas need not be re-oriented or replaced by narrower-beam antennas.

For instance, consider that the capacity of the cell in FIG. 1 is 6 channel sets that are being used. The normalized capacity is therefore 2 (6 channel sets used divided by 3 channel sets available). If only antennas 121, 123 and 125 are provided, using channel sets 151, 153 and 152 respectively, then the result is a conventional 3-sectored cell arrangement. Thus, the addition of antennas 152, 154 and 156 to a conventional 3-sectored cell doubles the capacity without any need to employ antenna types other than those with 120 degree beams.

Figure 7:
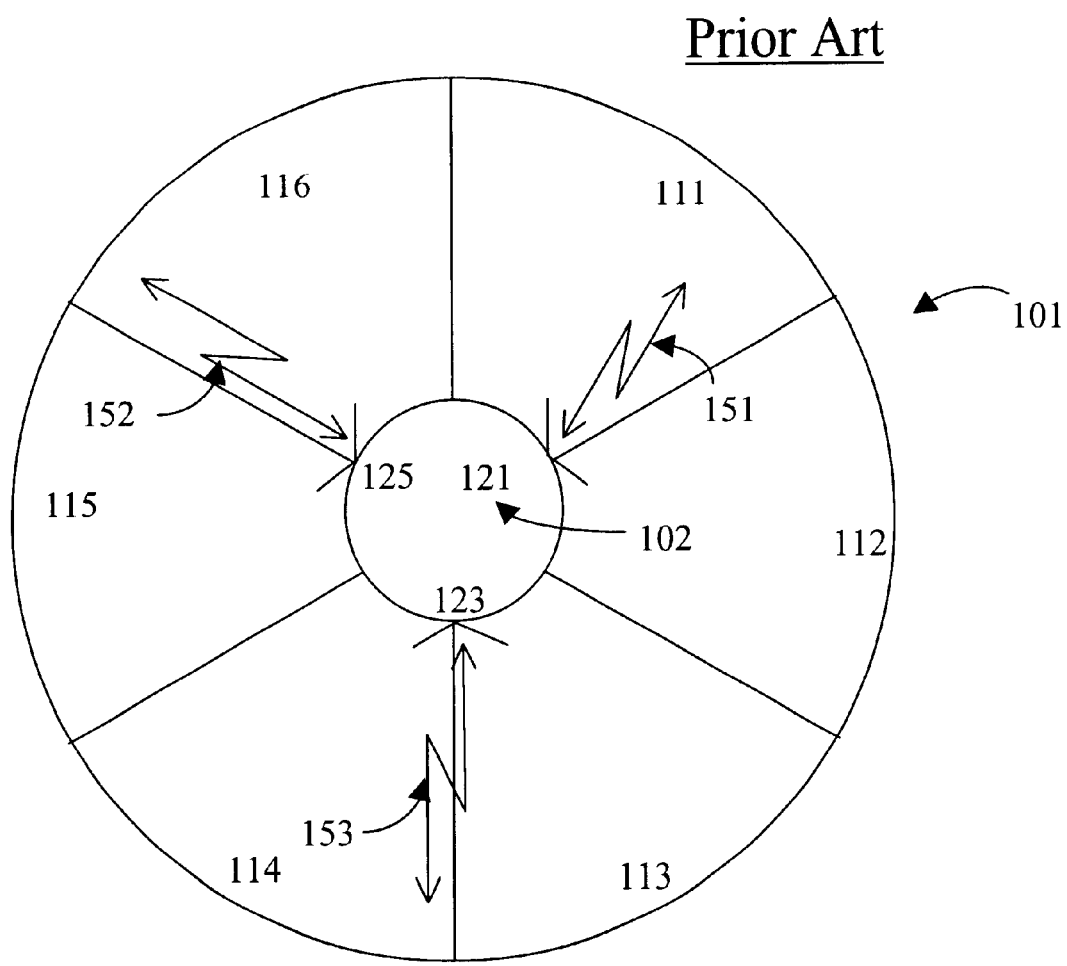
FIG. 7 is a schematic representation of a conventional three sectored cell.

The original three antennas need not be replaced or re-aligned. FIG. 7 depicts a conventional 3-sectored cell. The arrangement of FIG. 7 can be changed into that of FIG. 1 without changing the original three antennas or three channel sets used by those original three antennas. This has the advantage that service to the existing subscribers served by antennas 121, 123 and 125 need not be disrupted while the new configuration is being installed. By comparison, traditional cell-splitting techniques used to increase capacity in sectorized cellular radio systems, shown in FIG. 8 would involve replacement of the original 3 antennas 121, 123 and 125 by 6 new antennas 221–226, each covering only 60 degrees. Note also, that conventional cell-splitting techniques would involve the use of six channel sets 251–256 for the six sectors created.

While the foregoing description and drawings represent the preferred embodiments of the present invention, it will be understood that various changes and modifications may be made without departing from the spirit and scope of the present invention.

What is claimed is:

1. A millimeter-wave point-to-multipoint radio system having frequency reuse, comprising:
   a cell area divided into an integer number k sub-sectors of equal angular arc 360/k degrees each;
   a hub having antennas each configured to generate an antenna beam that covers an integer number j sub-sectors;
   an angular gap i being defined between edges of coverage of any pair of the antennas where i is an integer number of sub-sectors;
   a total integer number of n channel sets each of at least one radio channel and each configured independent and free of interference from other ones of the channels in other ones of the channel sets, each of the channel sets having a number of uses defined by a quantity k/(i+j) that is an integer equal or greater than two, each channel set being deployed with a common re-use pattern with an angular stagger between antennas of (i+j)/n sub-sectors.

2. A system as in claim 1, wherein the channel sets are arranged to cover each part of the cell by a uniform number of channel sets so that n=i+j, an angular stagger between k antennas being one sub-sector, with the k being also an integer that is indicative of a total number of antennas present at the hub.

3. A system as in claim 1, wherein neighboring ones of the antennas are arranged so that their antenna beams overlap between sub-sectors with j having a value that is greater than or equal to 2.

4. A system as in claim 3, wherein the remote stations are configured to dynamically re-tune from channels in one of the channel sets to channels in another of the channel sets in response to indication from the hub of current traffic conditions, the hub being configured to load balance as each of a plurality of remote stations comes within a coverage area of two channel sets by dynamically assigning the remote stations to one channel set or the other, depending on traffic conditions of the moment, to optimize use of both of the channel sets.

5. A system as in claim 3, wherein the hub is configured to broadcast information about current traffic loading in the channel sets, each of the remote stations being configured to autonomously choose which of the channel sets to use based on the information.

6. A system as in claim 3, further comprising memory in one remote station that is loaded with the one radio channel as a primary channel in the one channel set and is loaded with a secondary channel in another channel set, the one remote station being configured to tune to the primary channel and to monitor downstream signaling from the hub via one of the antennas, the remote station being configured to continuously check if communications with the hub on the primary channel needs to change and if so to tune to the secondary channel to re-establish communications with the hub.

7. A system as in claim 6, wherein the hub is configured to send a notification to the one remote station in response to the primary channel from the antenna becoming available again, the one remote station being configured to respond to the notification to retune to the primary channel again and re-establish communications with the hub via the one antenna.

8. A system as in claim 1, wherein the hub is configured to use kn/(i+j) antenna beams from the total number of antennas present at the hub.

9. A system as in claim 1, wherein a number of channels within each channel set being other than equal to each other.

10. A system as in claim 1, wherein the total number of sets available, n, is greater than 1+i/j so as to provide complete coverage of 360 degrees with no gaps of coverage.

11. A system as in claim 1, wherein a first of the antennas is arranged to provide coverage of a first of the j sub-sectors using a first channel set.

12. A system as in claim 1, wherein a next j-sectors are arranged after a gap of a next of the i sub-sectors and covered by another of the antennas and arranged to re-use the first channel set.

13. A system as in claim 1, wherein a number of times the first channel set is reused in the cell is equal to k/(i+j)>=2.

14. A system as in claim 1, wherein subsequent n-1 channel sets set2, set3 ... setn are spaced apart by i+j sub sectors and staggered in an angular manner.

15. A system as in claim 1, wherein variables k, j, i and n have values selected from a group consisting of a first set of values with k=6, j=2, i=1, n=3, a second set of values with k even, j=1, i=1, n=2 and a third set of values with k=6, j>i, n=2.

16. A system as in claim 1, wherein the hub and antennas are configured to provide a traffic capacity proportional to a number of the channel sets in use, a normalized measure of the capacity being a number of beams per the hub divided by a number of the channel sets available, the normalized capacity being at least two.

17. A system as in claim 1, further comprising memory in one of the remote stations that is loaded with a primary one of the channels in the one channel set and is loaded with a secondary one of the channels in another channel set, the one remote station being configured to tune to the primary channel and to monitor downstream signaling from the hub via one of the antennas, the remote station being configured to continuously check if communications with the hub on the primary channel needs to change and if so to tune to the secondary channel to re-establish communications with the hub.

18. A system as in claim 17, wherein the hub is configured to send a notification to the one remote station in response to the primary channel from the antenna becoming available again, the one remote station being configured to respond to the notification to retune to the primary channel again and re-establish communications with the hub via the one antenna.

19. A method of balancing traffic from users, comprising:
providing antennas within an existing hub to provide coverage, each of the antennas covering two sub-sectors of an area,
accepting traffic from remote stations within the area covered by the antennas,
providing communications through the antennas by using at least one radio channel of a channel set, the channel set being a set of at least one radio channel that is independent and free from interference from all other channels in the other channel sets,
balancing the traffic from certain users in one of the sub-sectors that is greater than the traffic from other users in an adjacent one of the sub-sectors, both the one sub-sector and the adjacent one of the sub-sectors being covered by a same one of the antennas, the remote stations dynamically re-tuning from channels in one of the channel sets to channels in another of the channel sets in response to indication from the hub of current traffic conditions, and
load balancing with the hub as each of the remote stations comes within a coverage area of two channel sets by dynamically assigning the remote stations to one channel set or the other, depending on traffic conditions of the moment, to optimize use of both of the channel sets.

20. A method of balancing traffic from users, comprising:
providing antennas within an existing hub to provide coverage, each of the antennas covering two sub-sectors of an area,
accepting traffic from remote stations within the area covered by the antennas,
providing communications through the antennas by using at least one radio channel of a channel set, the channel set being a set of at least one radio channel that is independent and free from interference from all other channels in the other channel sets,
balancing the traffic from certain users in one of the sub-sectors that is greater than the traffic from other users in an adjacent one of the sub-sectors, both the one sub-sector and the adjacent one of the sub-sectors being covered by a same one of the antennas, and
broadcasting with the hub information about current traffic loading in the channel sets, each of the remote stations autonomously choosing which of the channel sets to use based on the information.

21. A method of balancing traffic from users, comprising:
providing antennas within an existing hub to provide coverage, each of the antennas covering two sub-sectors of an area,
accepting traffic from remote stations within the area covered by the antennas,
providing communications through the antennas by using at least one radio channel of a channel set, the channel set being a set of at least one radio channel that is independent and free from interference from all other channels in the other channel sets,
balancing the traffic from certain users in one of the sub-sectors that is greater than the traffic from other users in an adjacent one of the sub-sectors, both the one sub-sector and the adjacent one of the sub-sectors being covered by a same one of the antennas, and
adding traffic capacity in the existing hub by providing overlapping beams to existing beams from the antennas without re-orienting existing ones of the antennas and without replacing existing ones of the antennas.

22. A method of balancing traffic from users, comprising:
providing antennas within an existing hub to provide coverage, each of the antennas covering two sub-sectors of an area,
accepting traffic from remote stations within the area covered by the antennas,
providing communications through the antennas by using at least one radio channel of a channel set, the channel set being a set of at least one radio channel that is independent and free from interference from all other channels in the other channel sets,
balancing the traffic from certain users in one of the sub-sectors that is greater than the traffic from other users in an adjacent one of the sub-sectors, both the one sub-sector and the adjacent one of the sub-sectors being covered by a same one of the antennas, and
loading into memory in one of the remote stations the channel as a primary channel in the one channel set and a secondary channel in another channel set, tuning the one remote station to the primary channel and monitoring downstream signaling from the hub via one of the antennas, continuously checking if communications with the hub on the primary channel needs to change and if so tuning to the secondary channel to re-establish communications with the hub.

23. A method as in claim 22, further comprising sending a notification to the one remote station in response to the primary channel from the antenna becoming available again, responding to the notification to retune to the primary channel again to re-establish communications with the hub via the one antenna.

24. A method as in claim 22, wherein the area spans 120 degrees, each of the sub-sectors spanning 60 degrees.

25. An apparatus to balance traffic from users, comprising:

antennas arranged within an existing hub to provide coverage, each of the antennas covering two sub-sectors of an area, the antennas being configured to accept traffic from remote stations within the area covered by the antennas, the antennas being configured to provide communications through use of at least one radio channel of a channel set, the channel set being a set of one or more of the radio channels that is independent and free from interference from all other channels in the other channel sets, and the antennas being arranged to balance the traffic from certain users in one of the sub-sectors that is greater than the traffic from other users in an adjacent one of the sub-sectors, both the one sub-sector and the adjacent one of the sub-sectors being covered by a same one of the antennas, the remote stations being configured to dynamically re-tune from channels in one of the channel sets to channels in another of the channel sets in response to indication from the hub of current traffic conditions, the hub being configured to load balance as each of the remote stations comes within a coverage area of two channel sets by dynamically assigning the remote stations to one channel set or the other, depending on traffic conditions of the moment, to optimize use of both of the channel sets.

26. An apparatus to balance traffic from users, comprising:

antennas arranged within an existing hub to provide coverage, each of the antennas covering two sub-sectors of an area, the antennas being configured to accept traffic from remote stations within the area covered by the antennas, the antennas being configured to provide communications through use of at least one radio channel of a channel set, the channel set being a set of one or more of the radio channels that is independent and free from interference from all other channels in the other channel sets, and the antennas being arranged to balance the traffic from certain users in one of the sub-sectors that is greater than the traffic from other users in an adjacent one of the sub-sectors, both the one sub-sector and the adjacent one of the sub-sectors being covered by a same one of the antennas, the hub being configured to broadcast information about current traffic loading in the channel sets, each of the remote stations being configured to autonomously choose which of the channel sets to use based on the information.

27. An apparatus to balance traffic from users, comprising:

antennas arranged within an existing hub to provide coverage, each of the antennas covering two sub-sectors of an area, the antennas being configured to accept traffic from remote stations within the area covered by the antennas, the antennas being configured to provide communications through use of at least one radio channel of a channel set, the channel set being a set of one or more of the radio channels that is independent and free from interference from all other channels in the other channel sets, and the antennas being arranged to balance the traffic from certain users in one of the sub-sectors that is greater than the traffic from other users in an adjacent one of the sub-sectors, both the one sub-sector and the adjacent one of the sub-sectors being covered by a same one of the antennas, and memory in one of the remote stations that is loaded with the channel as a primary channel in the one channel set and is loaded with a secondary channel in another channel set, the one remote station being configured to tune to the primary channel and to monitor downstream signaling from the hub via one of the antennas, the remote station being configured to continuously check if communications with the hub on the primary channel needs to change and if so to tune to the secondary channel to re-establish communications with the hub.

28. An apparatus to balance traffic from users, comprising:

antennas arranged within an existing hub to provide coverage, each of the antennas covering two sub-sectors of an area, the antennas being configured to accept traffic from remote stations within the area covered by the antennas, the antennas being configured to provide communications through use of at least one radio channel of a channel set, the channel set being a set of one or more of the radio channels that is independent and free from interference from all other channels in the other channel sets, and the antennas being arranged to balance the traffic from certain users in one of the sub-sectors that is greater than the traffic from other users in an adjacent one of the sub-sectors, both the one sub-sector and the adjacent one of the sub-sectors being covered by a same one of the antennas, the hub being configured to send a notification to the one remote station in response to the primary channel from the antenna becoming available again, the one remote station being configured to respond to the notification to retune to the primary channel again and re-establish communications with the hub via the one antenna.

* * * * *